United States Patent
Luo et al.

(10) Patent No.: US 9,557,500 B1
(45) Date of Patent: Jan. 31, 2017

(54) MULTI-CHANNEL OPTICAL TRANSMITTER-RECEIVER ASSEMBLY

(71) Applicant: Global Technology Inc., Ningbo (CN)

(72) Inventors: Jian-Hong Luo, Ningbo (CN); Chao-Hung Tsai, New Taipei (TW); Steve Chung, New Taipei (TW); Hua Liu, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 15/077,402

(22) Filed: Mar. 22, 2016

(30) Foreign Application Priority Data

Nov. 13, 2015 (CN) .......................... 2015 1 0777199

(51) Int. Cl.
G02B 6/42 (2006.01)
H04B 10/40 (2013.01)
G02B 6/28 (2006.01)

(52) U.S. Cl.
CPC ........... *G02B 6/4246* (2013.01); *G02B 6/2804* (2013.01); *G02B 6/425* (2013.01); *G02B 6/4285* (2013.01); *G02B 6/4292* (2013.01); *G02B 6/4295* (2013.01); *H04B 10/40* (2013.01)

(58) Field of Classification Search
CPC ..... G02B 6/4246; G02B 6/4295; G02B 6/425; G02B 6/4285; G02B 6/4292; G02B 6/2804; H01L 33/54; H01L 25/0753; H01L 2924/00; H01L 2924/0002
USPC .............................. 385/24, 88, 147, 100–109
See application file for complete search history.

(56) References Cited

U.S. PATENT DOCUMENTS

| | | | | |
|---|---|---|---|---|
| 5,448,661 A | * | 9/1995 | Takai | H04B 10/2503 385/17 |
| 6,398,424 B1 | * | 6/2002 | Jin | G02B 6/3696 385/59 |
| 2001/0053009 A1 | * | 12/2001 | Nojima | H04B 10/0775 398/141 |
| 2014/0161394 A1 | * | 6/2014 | Ho | G02B 6/4293 385/78 |
| 2014/0341578 A1 | * | 11/2014 | Ho | H04J 14/025 398/68 |
| 2014/0341580 A1 | * | 11/2014 | Wang | H04B 10/40 398/79 |
| 2015/0055960 A1 | * | 2/2015 | Zheng | H04B 10/503 398/135 |

(Continued)

*Primary Examiner* — Akm Enayet Ullah
(74) *Attorney, Agent, or Firm* — Grossman Tucker Perreault & Pfleger, PLLC (57) ABSTRACT

An optical transmitter-receiver assembly includes an optical transmitter-receiver device coupled via first optical fiber to optical splitter, plurality of second optical fibers each having a first end and a second end. The first ends is coupled to the optical splitter, the second ends are respectively coupled to plurality of optical connectors. The optical transmitter-receiver device includes main body and rubber sleeve. Space in the main body is divided into top portion and bottom portion by partition. Receiver is disposed in the top portion and coupled via fiber array to the first optical fiber. The receiver coupled via amplifier to flexible circuit board. Plurality of coaxial lasers is disposed in the bottom portion. Each of the plurality of coaxial lasers has an emitting end coupled to the first fiber, and the plurality of coaxial lasers coupled via inflexible circuit board to flexible circuit board.

7 Claims, 6 Drawing Sheets

(56) References Cited

U.S. PATENT DOCUMENTS

2016/0127044 A1* 5/2016 Ho .................... H04B 10/40
                                                    398/79
2016/0164251 A1* 6/2016 Yashiki ............ G02B 6/4204
                                                    385/2

* cited by examiner

MULTI-CHANNEL OPTICAL TRANSMITTER-RECEIVER ASSEMBLY

CROSS-REFERENCE TO RELATED APPLICATIONS

This non-provisional application claims priority under 35 U.S.C. §119(a) on Patent Application No(s). 201510777199.3 filed in China on Nov. 13, 2015, the entire contents of which are hereby incorporated by reference.

TECHNICAL FIELD

The present disclosure related to an optical communication assembly, more particular to a multi-channel optical transmitter-receiver assembly.

BACKGROUND

With the popularity of optical communication apparatus, the demand of the cost reduction and the functionality improvement to the optical communication apparatus has been increasing. The optical component is one of the essential components in the optical communication apparatus, especially in the optical transmitter-receiver module for digital communication. In a conventional optical transmitter-receiver module, the optical component accounts for more than 80% of total cost. Under the condition of same optical output power, the higher the coupling efficiency is, the less the drive current is needed, and thereby leading to less power consumption. Thus, the coupling efficiency of the optical transmitter-receiver module is important when it is operated at high temperature. Furthermore, under the condition of same drive current and same optical output power, the higher the coupling efficiency is, the lower the luminous efficacy of a laser diode is needed, and thereby reducing the cost of the optical transmitter-receiver module.

In order to increase the capacity and the density of a compact optical transmitter-receiver module in the conventional data center, both the transmission rate of the optical signal in each channel and the number of the channel should be increased. Thus, the manufacturers usually equip the optical communication apparatus with a multi-channel parallel optical transmitter-receiver module. The optical components are conventionally coupled to each other by the optical fibers and the jumper, which is a higher cost method. When the conventional data center has the multi-channel parallel signal transmission system, the MPO/MTP connector is adapted for connecting the optical components for multi-channel parallel signal transmission, and the cost of the MPO/MTP connector is up to 15 USD which is extremely expensive for the data center.

Therefore, there is a need to develop an optical transmitter-receiver assembly for multi-channel parallel signal transmission featuring low cost.

SUMMARY

The present disclosure provides a multi-channel optical transmitter-receiver assembly featuring low cost for solving the problems in the conventional optical transmitter-receiver module.

According to one aspect of the disclosure, a multi-channel optical transmitter-receiver assembly includes an optical transmitter-receiver device coupled via a first optical fiber to an optical splitter. A plurality of second optical fibers each has a first end and a second end that are opposite to each other. The first ends are coupled to the optical splitter, and the second ends are respectively coupled to a plurality of optical connectors. The optical transmitter-receiver device includes a main body and a rubber sleeve. A space in the main body is divided into a top portion and a bottom portion by a partition. A multi-channel receiver is disposed in the top portion and coupled via a multi-channel fiber array to the first optical fiber for being an optical receiver module. The multi-channel receiver is coupled via a multi-channel amplifier to a first flexible circuit board. A plurality of coaxial lasers is disposed in the bottom portion. Every two of the plurality of coaxial lasers that are adjacent to each other are side by side in the bottom portion. Each of the plurality of coaxial lasers has an emitting end coupled to the first fiber, and the plurality of coaxial lasers is coupled via an inflexible circuit board to a second flexible circuit board.

According to the disclosure, the optical transmitter-receiver device is coupled to the optical splitter via the first optical fiber, and the second optical fibers are coupled to the first optical fiber via the optical splitter. The end of the second optical fiber opposite to the optical splitter is coupled to the optical connector. Therefore, the optical transmitter-receiver device is capable of being coupled to multiple ports, wherein the optical connector can be a port for receiving optical signal or alternatively a port for transmitting optical signal. The multi-channel optical transmitter-receiver assembly in the disclosure features simple structure and low cost. Furthermore, the space in the main body of the optical transmitter-receiver device is divided into two portions by the partition, wherein an optical receiver module is disposed in the top portion, and an optical transmitter module is disposed in the bottom portion. Some of the fiber units of the first optical fiber for receiving light are coupled to the optical receiver module, and some of the fiber units of the first optical fiber for transmitting light are coupled to the optical transmitter module. The optical receiver module is spaced apart from the optical transmitter module, and the interference between the optical receiver module and the optical transmitter module can be prevented. Therefore, it is favorable for achieving an easier multi-channel parallel transmission with low cost.

According to another aspect of the disclosure, the optical transmitter-receiver device further comprises a top cover and a bottom cover. The top cover covers the top portion of the space in the main body, and the bottom cover covers the bottom portion of the space in the main body. Therefore, it is favorable for protecting the elements in the top portion and the bottom portion.

According to still another aspect of the disclosure, each of the coaxial lasers includes a pigtail, an adjusting ring, a lens, a laser diode, a laser driver, a backlight monitor, a support and a base. The pigtail is located at a tail end of the coaxial laser for being coupled to the first optical fiber, and the pigtail is connected to the base via the adjusting ring. The lens .3 is disposed to the base and located between the laser diode, and the adjusting ring for transmitting laser light emitted by the laser diode to the first optical fiber. Each of the pigtails is coupled to an emitting fiber, and the emitting fibers are coupled to the first optical fiber by the rubber sleeve. The support is located at a head end of the coaxial laser opposite to the tail end. The support is connected to the base. The laser diode, the laser driver and the backlight monitor are all disposed to the support. The head end of the coaxial laser is coupled to the second flexible circuit board via the inflexible circuit board. The side-by-side arrangement of the coaxial lasers in the optical transmitter module is favorable for improving the coupling efficiency and keeping the optical transmitter module compact.

According to yet still another aspect of the disclosure, every two of the coaxial lasers that are adjacent to each other have an angle therebetween. The tail ends of the coaxial lasers are arranged close to each other, and the head ends of the coaxial lasers are arranged away from each other. In detail, the distance between adjacent two tail ends can be smaller than the distance between adjacent two head ends. The angle between adjacent two coaxial lasers can be from 3 degrees to 20 degrees. Compared with the coaxial lasers arranged parallel to each other, the aforementioned arrangement of the coaxial lasers is favorable for reducing the amount of space that the tail ends needs. Moreover, since the head ends of the coaxial lasers are not arranged linearly, a side of the inflexible circuit board is shaped to have a proper curvature for matching the head ends of the coaxial lasers, and thereby the head ends of the coaxial lasers are capable of being abutted against the inflexible circuit board.

According to yet still another aspect of the disclosure, each of the optical connectors is a duplex LC connector. Each of the duplex LC connectors is coupled to two of the second optical fibers. Therefore, one end of the optical connectors is adapted for a transmitting port while the other end is adapted for a receiving port, and thereby the optical connector with common type is applicable to the conventional specification.

According to yet still another aspect of the disclosure, the diameter of the first optical fiber is larger than the diameter of the second optical fiber. Since the amount of optical signal transmitted in the first optical fiber is more than the amount of optical signal in the second optical fiber, the arrangement of the diameters is favorable for improving the stability and the speed of signal transmission.

According to yet still another aspect of the disclosure, the number of the second optical fibers is eight. The multi-channel receiver in the top portion is a four-channel receiver. The multi-channel fiber array is a four-channel fiber array. The number of the coaxial lasers in the bottom portion is four. Therefore, the multi-channel optical transmitter-receiver assembly is applicable to the multi-channel optical system having four transmit channel and four receive channel in the conventional data center.

BRIEF DESCRIPTION OF THE DRAWINGS

The present invention will become more understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure has been described in detail with particular reference to an embodiment thereof, but it will be understood that variations and modifications can be effected within the spirit and scope of the disclosure. In this disclosure, relative terms, such as "bottom" or "top", may be used herein to describe one element's relationship to another element as illustrated in the Figures. It will be understood that relative terms are intended to encompass different orientations of the device in addition to the orientation depicted in the Figures.

Figure 1:
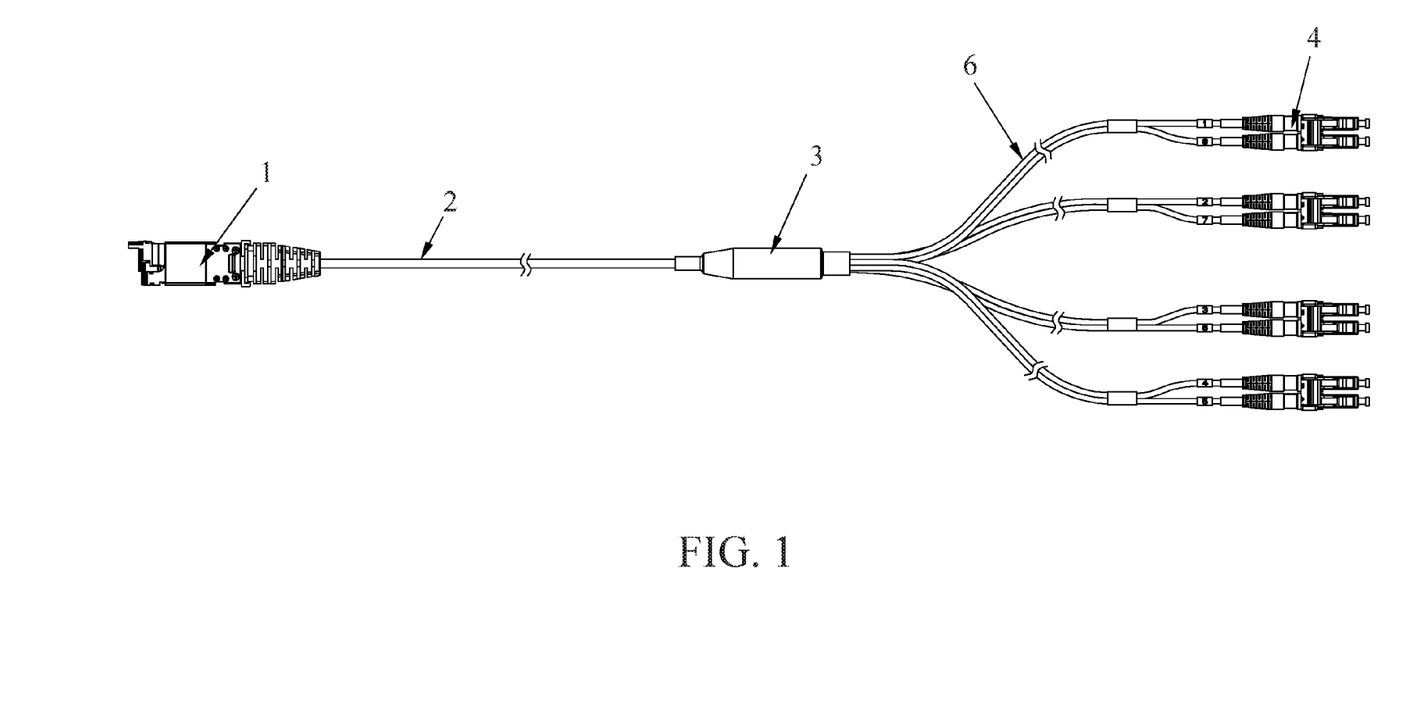
FIG. 1 is a schematic view of a multi-channel optical transmitter-receiver assembly according to an embodiment.
Figure 2:
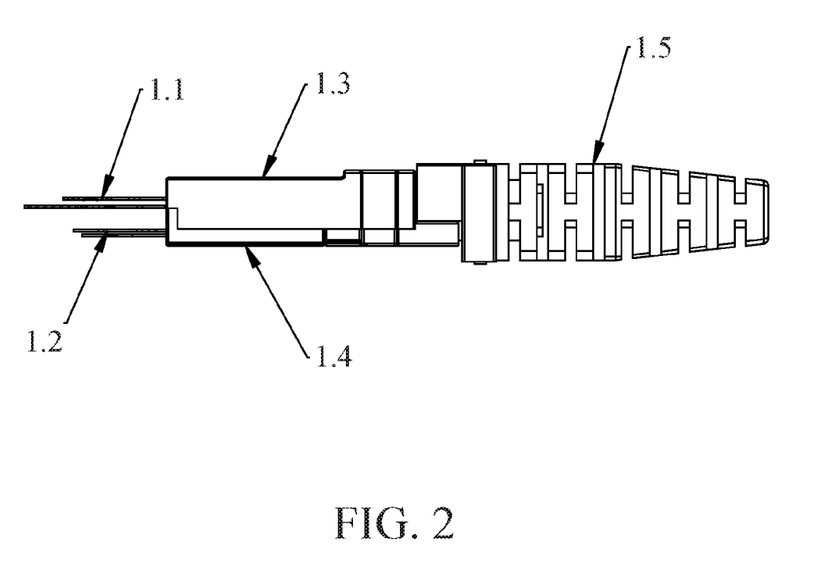
FIG. 2 is a side view of an optical transmitter-receiver device of the multi-channel optical transmitter-receiver assembly in FIG. 1.
Figure 3:
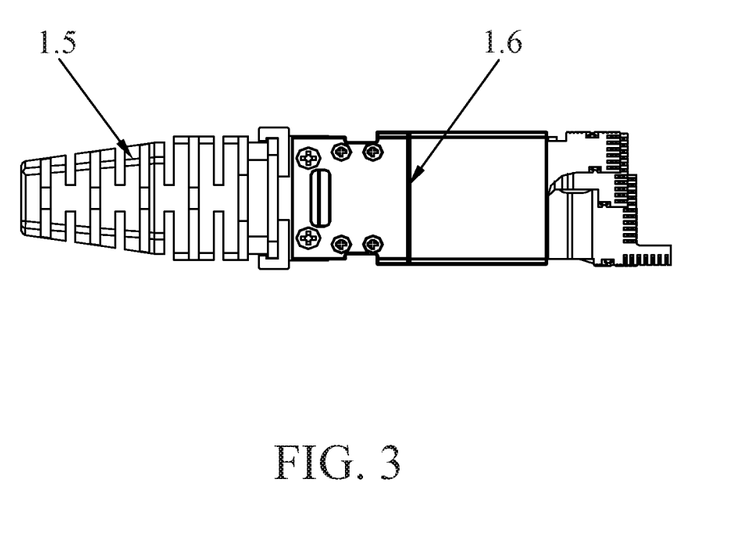
FIG. 3 is a bottom view of the optical transmitter-receiver device in FIG. 2.
Figure 4:
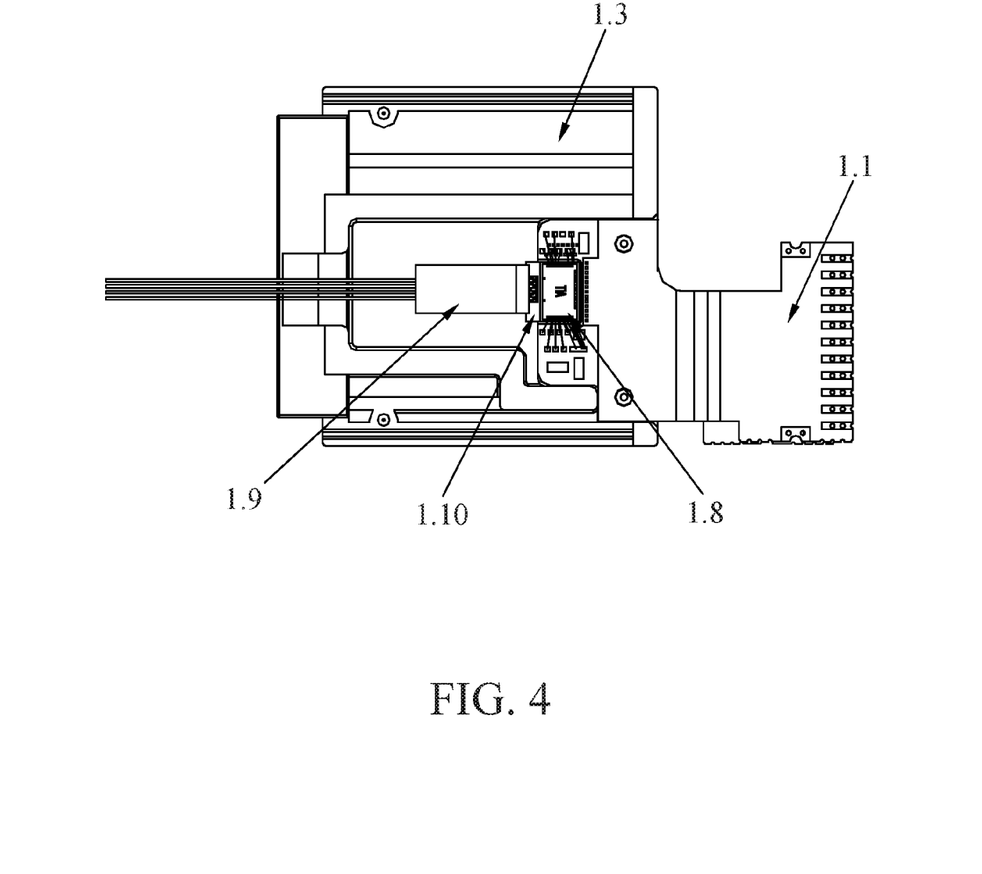
FIG. 4 is a schematic view of a top portion of a space in the optical transmitter-receiver device in FIG. 2.
Figure 5:
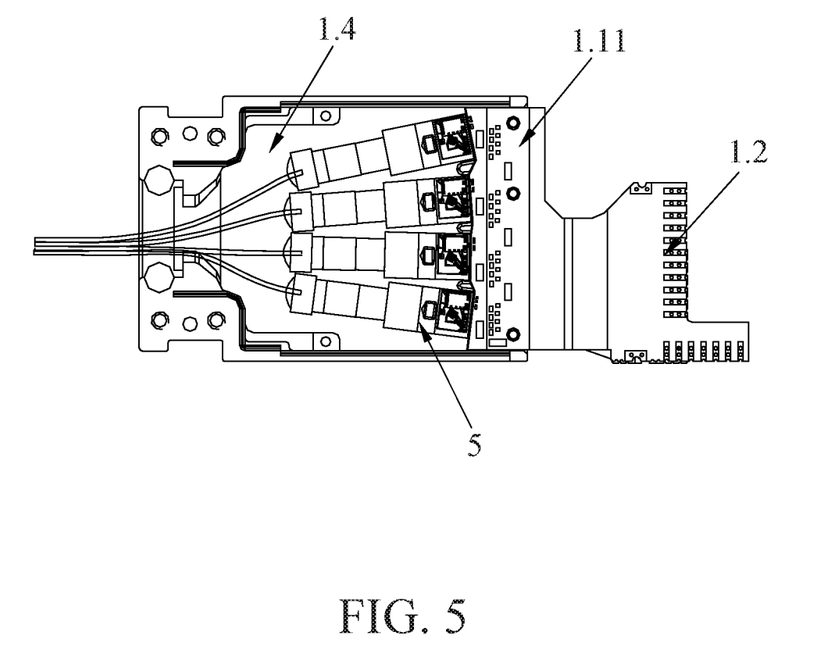
FIG. 5 is a schematic view of a bottom portion of the space in the optical transmitter-receiver device in FIG. 2.
Figure 6:
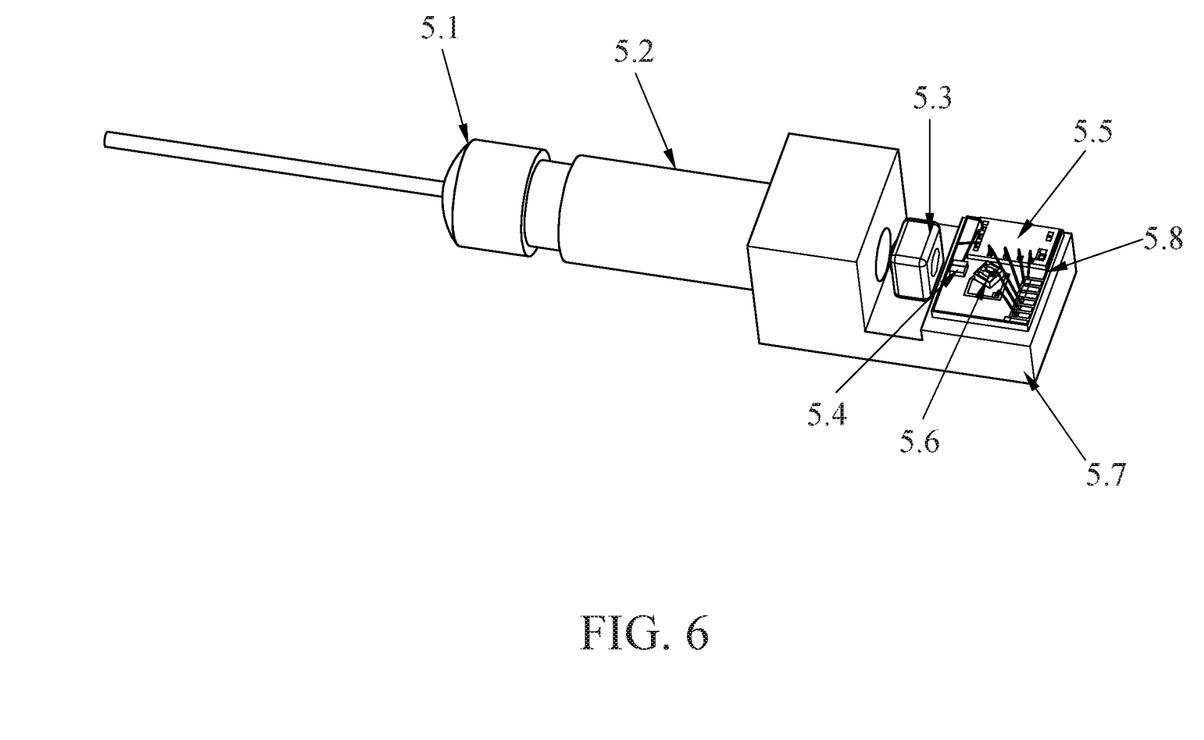
FIG. 6 is a schematic view of a coaxial laser in FIG. 5.

Please refer to FIG. 1 to FIG. 6. FIG. 1 is a schematic view of a multi-channel optical transmitter-receiver assembly according to an embodiment. FIG. 2 is a side view of an optical transmitter-receiver device of the multi-channel optical transmitter-receiver assembly in FIG. 1. FIG. 3 is a bottom view of the optical transmitter-receiver device in FIG. 2. FIG. 4 is a schematic view of a top portion of a space in the optical transmitter-receiver device in FIG. 2. FIG. 5 is a schematic view of a bottom portion of the space in the optical transmitter-receiver device in FIG. 2. FIG. 6 is a schematic view of a coaxial laser in FIG. 5.

The multi-channel optical transmitter-receiver assembly may include an optical transmitter-receiver device 1. The optical transmitter-receiver device 1 is coupled to an optical splitter 3 via a first optical fiber 2. A plurality of second optical fibers 6 can be coupled to the first optical fiber 2. In detail, each of the second optical fibers 6 has a first end and a second end that are opposite to each other. The first ends of the second optical fibers 6 are coupled to the optical splitter 3 for a light beam in the first optical fiber 2 to be distributed among the second optical fibers 6. The second ends of the second optical fibers 6 are respectively coupled to a plurality of optical connectors 4. The optical transmitter-receiver device 1 includes a main body 1.6 and a rubber sleeve 1.5. A space in the main body 1.6 is divided into a top portion and a bottom portion by a partition (not shown in the drawings). A multi-channel receiver 1.10 is disposed in the top portion and coupled to the first optical fiber 2 via a multi-channel fiber array 1.9 for being an optical receiver module. The first optical fiber 2 may include a plurality of fiber units coupled to the multi-channel fiber array 1.9. The multi-channel receiver 1.10 is coupled to a first flexible circuit board 1.1 via a multi-channel amplifier 1.8. A plurality of coaxial lasers 5 is disposed in the bottom portion in the main body 1.6. Every two of the coaxial lasers 5 that are adjacent to each other are arranged side by side. Each of the coaxial lasers 5 has an emitting end coupled to the first fiber 2. The emitting ends are respectively coupled to one of a bundle of optical fibers, and the emitting ends are coupled to the first fiber 2 via the bundle of optical fibers. The coaxial lasers 5 are coupled to a second flexible circuit board 1.2 via an inflexible circuit board 1.11. The rubber sleeve 1.5 is adapted for coupling the main body 1.6 to the first optical fiber 2 and protecting the first optical fiber 2. The multi-channel fiber array 1.9 and the multi-channel receiver 1.10 are known by one having ordinary skill in the art so that the illustration for the multi-channel fiber array 1.9 and the multi-channel receiver 1.10 is omitted.

According to the disclosure, the optical transmitter-receiver device is coupled to the optical splitter via the first optical fiber, and the second optical fibers are coupled to the first optical fiber via the optical splitter. The end of the second optical fiber opposite to the optical splitter is coupled to the optical connector. Therefore, the optical transmitter-receiver device is capable of being coupled to multiple ports, wherein the optical connector can be a port for receiving optical signal or alternatively a port for transmitting optical signal. The multi-channel optical transmitter-receiver assembly in the disclosure features simple structure and low cost. Furthermore, the space in the main body of the optical transmitter-receiver device is divided into two portions by the partition, wherein an optical receiver module is disposed in the top portion, and an optical transmitter module is disposed in the bottom portion. Some of the fiber units of the first optical fiber for receiving light are coupled to the optical receiver module, and some of the fiber units of the first optical fiber for transmitting light are coupled to the optical transmitter module. The optical receiver module is spaced apart from the optical transmitter module, and the interference between the optical receiver module and the optical transmitter module can be prevented. Therefore, it is favorable for achieving an easier multi-channel parallel transmission with low cost.

In this embodiment, the optical transmitter-receiver device 1 further comprises a top cover 1.3 and a bottom cover 1.4. The top cover 1.3 covers the top portion of the space in the main body 1.6, and the bottom cover 1.4 covers the bottom portion of the space in the main body 1.6. Therefore, it is favorable for protecting the elements in the top portion and the bottom portion.

In this embodiment, each of the coaxial lasers 5 includes a pigtail 5.1, an adjusting ring 5.2, a lens 5.3, a laser diode 5.4, a laser driver 5.5, a backlight monitor 5.6, a support 5.8 and a base 5.7. The pigtail 5.1 is located at a tail end of the coaxial laser 5 for being coupled to the first optical fiber 2, and the pigtail 5.1 is connected to the base 5.7 via the adjusting ring 5.2. The lens 5.3 is disposed to the base 5.7 and located between the laser diode 5.4 and the adjusting ring 5.2 for transmitting laser light emitted by the laser diode 5.4 to the first optical fiber 2. Each of the pigtails 5.1 is coupled to an emitting fiber, and the emitting fibers are coupled to the first optical fiber 2 by the rubber sleeve 1.5. The support 5.8 is located at a head end of the coaxial laser 5 opposite to the tail end. The support 5.8 is connected to the base 5.7. The laser diode 5.4, the laser driver 5.5 and the backlight monitor 5.6 are all disposed to the support 5.8. The head end of the coaxial laser 5 is coupled to the second flexible circuit board 1.2 via the inflexible circuit board 1.11. The side-by-side arrangement of the coaxial lasers 5 in the optical transmitter module is favorable for improving the coupling efficiency and keeping the optical transmitter module compact.

In this embodiment, every two of the coaxial lasers 5 that are adjacent to each other have an angle therebetween. The tail ends of the coaxial lasers 5 are arranged close to each other, and the head ends of the coaxial lasers 5 are arranged away from each other. In detail, the distance between adjacent two tail ends can be smaller than the distance between adjacent two head ends. The angle between adjacent two coaxial lasers 5 can be from 3 degrees to 20 degrees. Compared with the coaxial lasers arranged parallel to each other, the aforementioned arrangement of the coaxial lasers 5 is favorable for reducing the amount of space that the tail ends needs. Moreover, since the head ends of the coaxial lasers 5 are not arranged linearly, a side of the inflexible circuit board 1.11 is shaped to have a proper curvature for matching the head ends of the coaxial lasers 5, and thereby the head ends of the coaxial lasers 5 are capable of being abutted against the inflexible circuit board 1.11.

In this embodiment, each of the optical connectors 4 is a duplex LC connector. Each of the duplex LC connectors is coupled to two of the second optical fibers 6. Therefore, one end of the optical connectors 4 is adapted for a transmitting port while the other end is adapted for a receiving port, and thereby the optical connector 4 with common type is applicable to the conventional specification.

In this embodiment, the diameter of the first optical fiber 2 is larger than the diameter of the second optical fiber 6. Since the amount of optical signal transmitted in the first optical fiber 2 is more than the amount of optical signal in the second optical fiber 6, the arrangement of the diameters is favorable for improving the stability and the speed of signal transmission.

In this embodiment, the number of the second optical fibers 6 is eight. The multi-channel receiver 1.10 in the top portion is a four-channel receiver. The multi-channel fiber array 1.9 is a four-channel fiber array. The number of the coaxial lasers 5 in the bottom portion is four. Therefore, the multi-channel optical transmitter-receiver assembly is applicable to the multi-channel optical system having four transmit channel and four receive channel in the conventional data center.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A multi-channel optical transmitter-receiver assembly, comprising an optical transmitter-receiver device coupled via a first optical fiber to an optical splitter, a plurality of second optical fibers each having a first end and a second end that are opposite to each other, the first ends coupled to the optical splitter, the second ends respectively coupled to a plurality of optical connectors, the optical transmitter-receiver device comprising a main body and a rubber sleeve, a space in the main body divided into a top portion and a bottom portion by a partition, a multi-channel receiver disposed in the top portion and coupled via a multi-channel fiber array to the first optical fiber for being an optical receiver module, the multi-channel receiver coupled via a multi-channel amplifier to a first flexible circuit board, a plurality of coaxial lasers disposed in the bottom portion, every two of the plurality of coaxial lasers that are adjacent to each other being side by side in the bottom portion, each of the plurality of coaxial lasers having an emitting end coupled to the first fiber, and the plurality of coaxial lasers coupled via an inflexible circuit board to a second flexible circuit board.

2. The multi-channel optical transmitter-receiver assembly according to claim 1, wherein the optical transmitter-receiver device further comprises a top cover and a bottom cover, the top cover covers the top portion of the space in the main body, and the bottom cover covers the bottom portion of the space in the main body.

3. The multi-channel optical transmitter-receiver assembly according to claim 1, wherein each of the plurality of coaxial lasers comprises a pigtail, an adjusting ring, a lens, a laser diode, a laser driver, a backlight monitor, a support and a base, the pigtail is located at a tail end of the coaxial laser for being coupled to the first optical fiber and connected to the base via the adjusting ring, the lens is disposed to the base and located between the laser diode and the adjusting ring for transmitting laser light emitted by the laser diode to the first optical fiber, the support is located at a head end of the coaxial laser opposite to the tail end, the support is connected to the base, the laser diode, the laser driver and the backlight monitor are disposed to the support, the head end of the coaxial laser is coupled via the inflexible circuit board to the second flexible circuit board.

4. The multi-channel optical transmitter-receiver assembly according to claim 3, wherein every two of the plurality of coaxial lasers that are adjacent to each other have an angle therebetween, the tail ends of the plurality of coaxial lasers are arranged close to each other, the head ends of the plurality of coaxial lasers are arranged away from each other, and the angle is from 3 degrees to 20 degrees.

5. The multi-channel optical transmitter-receiver assembly according to claim 1, wherein each of the plurality of optical connectors is a duplex LC connector, each of the duplex LC connectors is coupled to two of the plurality of second optical fibers.

6. The multi-channel optical transmitter-receiver assembly according to claim 1, wherein a diameter of the first optical fiber is larger than a diameter of each of the plurality of second optical fibers.

7. The multi-channel optical transmitter-receiver assembly according to claim 1, wherein a number of the plurality of second optical fibers is eight, the multi-channel receiver in the top portion is a four-channel receiver, the multi-channel fiber array is a four-channel fiber array, and a number of the plurality of coaxial lasers in the bottom portion is four.

* * * * *